US009452615B2

(12) United States Patent
Arima

(10) Patent No.: US 9,452,615 B2
(45) Date of Patent: Sep. 27, 2016

(54) IMAGE ERASING APPARATUS AND IMAGE FORMING APPARATUS HAVING IMAGE ERASING FUNCTION

(71) Applicants: KABUSHIKI KAISHA TOSHIBA, Tokyo (JP); TOSHIBA TEC KABUSHIKI KAISHA, Tokyo (JP)

(72) Inventor: Yasuharu Arima, Tokyo (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 14/090,925

(22) Filed: Nov. 26, 2013

(65) Prior Publication Data

US 2014/0192128 A1 Jul. 10, 2014

(30) Foreign Application Priority Data

Jan. 8, 2013 (JP) ................................ 2013-001283

(51) Int. Cl.
*G06K 15/00* (2006.01)
*B41J 2/32* (2006.01)
*B41J 29/26* (2006.01)

(52) U.S. Cl.
CPC *B41J 2/32* (2013.01); *B41J 29/26* (2013.01); *B41J 2202/37* (2013.01)

(58) Field of Classification Search
None
See application file for complete search history.

(56) References Cited

U.S. PATENT DOCUMENTS

| | | | | |
|---|---|---|---|---|
| 2007/0146779 A1* | 6/2007 | Yamada | G06K 9/6828 358/1.15 |
| 2007/0201926 A1* | 8/2007 | Kato | G06F 3/1208 400/62 |
| 2009/0122350 A1* | 5/2009 | Alverson | B41J 29/393 358/3.28 |
| 2011/0205572 A1* | 8/2011 | Tsuchitoi | H04N 1/00846 358/1.14 |
| 2011/0222130 A1 | 9/2011 | Iguchi et al. | |
| 2011/0235075 A1 | 9/2011 | Iguchi et al. | |
| 2011/0305851 A1* | 12/2011 | Wang | B41M 5/52 428/32.31 |
| 2011/0317198 A1* | 12/2011 | Suzuki | B41M 7/0009 358/1.13 |
| 2012/0327487 A1 | 12/2012 | Kamisuwa et al. | |
| 2013/0016375 A1 | 1/2013 | Hashidume et al. | |

OTHER PUBLICATIONS

Office Action mailed Nov. 25, 2014, filed in corresponding Japanese Patent Application No. 2013-001283, with English translation.

* cited by examiner

*Primary Examiner* — John Wallace
(74) *Attorney, Agent, or Firm* — Patterson & Sheridan, LLP

(57) ABSTRACT

Provided are an image erasing apparatus which erases an image printed on a sheet and an image forming apparatus having an image erasing function. The image erasing apparatus and the image forming apparatus each include a readout unit, an erasing unit, and a control unit. The control unit acquires authentication information of a user who uses the apparatuses and allows the erasing unit to erase the image when determining that the acquired authentication information coincides with authentication information read out by the readout unit.

3 Claims, 6 Drawing Sheets

| ID | PA | E-MAIL ADDRESS | DEPARTMENT CODE | THE NUMBER OF ERASEDE SHEETS |
|---|---|---|---|---|
| 1000123 | 123456 | abc@cdf.com | 001 | 102 |

Fig.3

IMAGE ERASING APPARATUS AND IMAGE FORMING APPARATUS HAVING IMAGE ERASING FUNCTION

CROSS-REFERENCE TO RELATED APPLICATION

This application is based upon and claims the benefit of priority from the prior Japanese Patent Application No. 2013-1283, filed on Jan. 8, 2013, the entire contents of which are incorporated herein by reference.

FIELD

Embodiments described herein relate generally to an image erasing apparatus which erases an image and an image forming apparatus having an image erasing function.

BACKGROUND

In order to save the resource or reduce the cost, an image erasing apparatus has been put to practical use to erase an image printed on a recording medium, for example, a sheet by an erasable color agent.

The erasable color agent is decolored by, for example, heating. Accordingly, the image erasing apparatus includes an erasing unit which heats the image on the sheet. The erasing unit heats the image on the sheet to erase the image. The image erasing apparatus includes a sheet discharging unit which accommodates the heated sheet and a conveyance path which conveys the sheet to the sheet discharging unit.

The image erasing apparatus is often shared by many users. Accordingly, sheets of other users may be mixed with a sheet of any user who wants to erase an image and then set in the image erasing apparatus. When the sheets of many users are mixed, there is a possibility that the images on the sheets of other users as well as the image on the sheet of any user may be erased by mistake.

Moreover, there is a case where only specific user wants to be allowed to use the image erasing apparatus. Moreover, the image erasing apparatus of the related art could not perceive a use situation of each user.

BRIEF DESCRIPTION OF THE DRAWINGS

FIG. 3 is a diagram illustrating a data configuration of an authentication table used in the image erasing apparatus according to the first embodiment;

DETAILED DESCRIPTION

Figure 1:
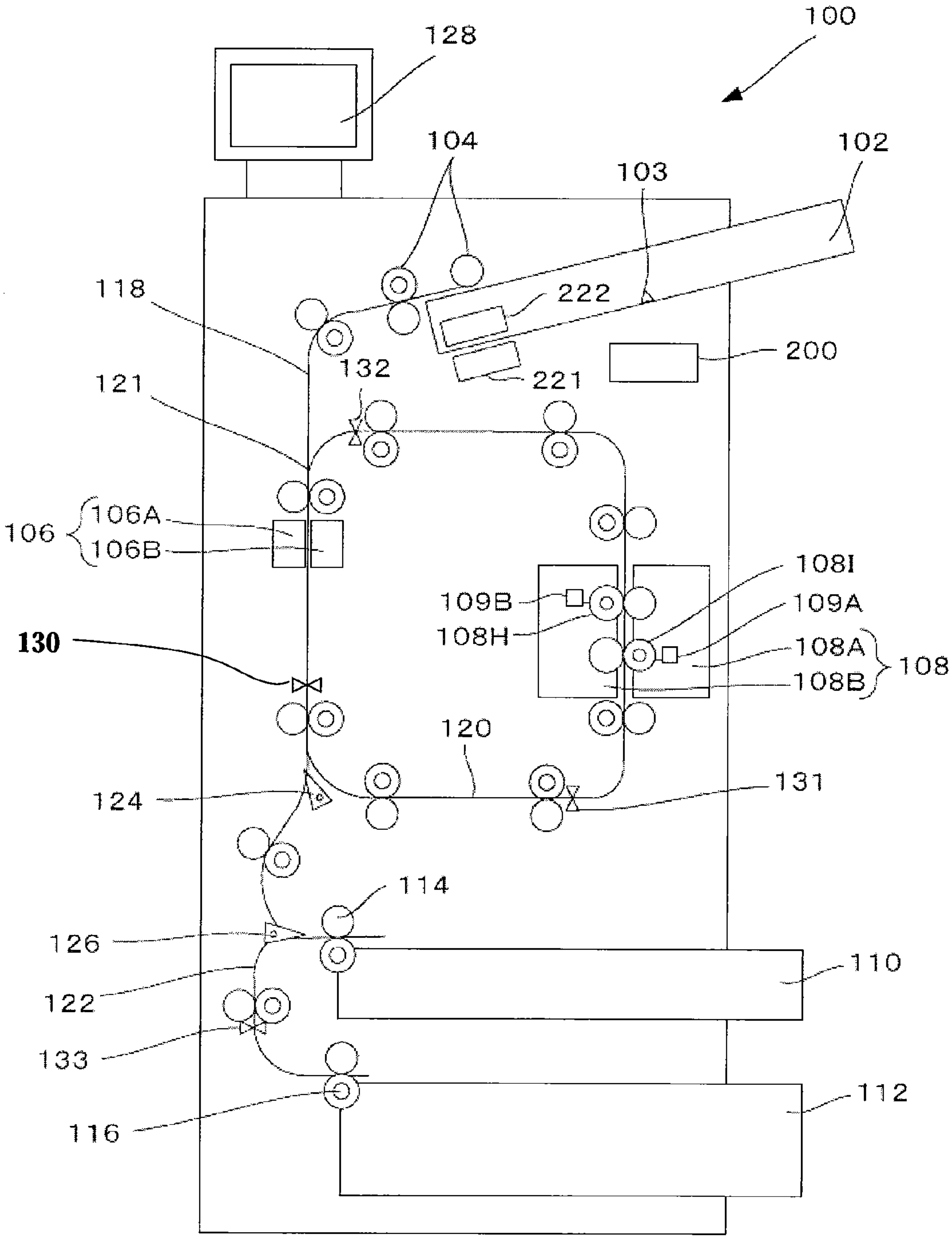
FIG. 1 is a cross-sectional view illustrating an image erasing apparatus according to a first embodiment.

According to embodiments, an image erasing apparatus which erases an image printed on a sheet and an image forming apparatus having an image erasing function are provided. The image erasing apparatus and the image forming apparatus includes a readout unit, an erasing unit, and a control unit. The readout unit reads out authentication information of a user who prints an image, the authentication information of the user being contained in the image printed on the sheet. The erasing unit erases the image printed on the sheet. The control unit acquires authentication information of a user who uses the apparatuses, determines whether the acquired authentication information coincides with the read out authentication information, and allows the erasing unit to erase the image when determining that the acquired authentication information coincides with the read out authentication information.

The embodiments of the image erasing apparatus and the image forming apparatus will be described below in detail with reference to the drawings. In the drawings, the same reference numeral indicates the same or similar component.

An image erasing apparatus 100 executes an erasing processing to decolor erasable color materials from a recording medium such as a sheet on which an image is printed with the erasable color materials and to erase the image on the sheet. For example, erasable toners or erasable inks and the like are used as the erasable color materials.

FIG. 1 is a cross-sectional view illustrating an image erasing apparatus according to a first embodiment. As illustrated in FIG. 1, the image erasing apparatus 100 includes a sheet feeding cassette 102, a sheet feeding member 104, a readout unit 106, an erasing unit 108, a reuse box 110, a reject box 112, discharge members 114 and 116, a first conveyance path 118, a second conveyance path 120, a third conveyance path 122, a first branch member 124, a second branch member 126, and an operation unit 128.

The sheet feeding cassette 102 accommodates a sheet for erasing the printed image, that is, a sheet for reusing in a stacked state. The sheet feeding cassette 102 accommodates various sizes of sheets, such as A4, A3, and B5. The image erasing apparatus 100 body includes a mounting portion which detachably supports the sheet feeding cassette 102. Accordingly, each user can mount the sheet feeding cassette 102 onto the image erasing apparatus 100. The sheet feeding cassette 102 accommodates a sheet on which an image is printed with, for example, an erasable color material which is decolored by being heated to a predetermined temperature or more.

The sheet feeding member 104 includes a pickup roller, a sheet feeding roller, and a separation roller disposed opposite to the sheet feeding roller or the like. The sheet feeding member 104 takes out a sheet one by one from the sheet feeding cassette 102 and then feeds the sheet to the first conveyance path 118.

Moreover, the sheet feeding cassette 102 includes a detection sensor 103 which detects the presence or absence of the sheet in the sheet feeding cassette 102. The detection sensor 103 is configured with, for example, a microsensor or a micro actuator.

The first conveyance path 118 forms a conveyance path extending from the sheet feeding cassette 102 to the reuse box 110. The first conveyance path 118 conveys the fed sheet to the reuse box 110 through the readout unit 106.

The readout unit 106 is disposed along the first conveyance path 118 at a downstream position in a sheet conveyance direction from the sheet feeding cassette 102. The readout unit 106 includes a readout unit such as a charge coupled device (CCD) scanner or a CMOS sensor.

The readout unit 106 according to the first embodiment reads out each of images on a first surface and a second surface of the sheet to be conveyed. Specifically, the readout unit 106 includes a first readout unit 106A and a second readout unit 106B, which are disposed along the first conveyance path 118 with the conveyance path therebetween, so as to read out the images on both surfaces of the sheet to be conveyed. A readout position indicates that a position where the image on the sheet is read out by the readout units 106A and 106B. The image read out by the readout unit 106 is stored in a storage unit 210 illustrated in FIG. 2.

For example, before the erasing processing, the image erasing apparatus 100 digitizes the image read out by the readout unit 106 and then stores the digitized image in the storage unit 210. Therefore, for example, when the user requires the erased image after the erasing processing, the user can acquire data of the image. A control unit 200 to be described below determines whether the conveyed sheet is a sheet on which the erasable image is printed, based on the image read out by the readout unit 106. Furthermore, the control unit 200 determines whether the conveyed sheet is a reusable sheet based on the image read out by the readout unit 106.

The first conveyance path 118 of the image erasing apparatus 100 includes the first branch member 124 as a switching member for switching a conveyance direction of the sheet. The first branch member 124 is provided at a downstream position in the sheet conveyance direction from readout unit 106.

The first branch member 124 switches the conveyance direction of the sheet to be conveyed. The first branch member 124 conveys the sheet to be conveyed through the first conveyance path 118 to the second conveyance path 120 or the reuse box 110.

The second conveyance path 120 is branched from the first conveyance path 118 in a branch point at which the first branch member 124 is disposed. The second conveyance path 120 branched from the branch point conveys the sheet to the erasing unit 108. Moreover, the second conveyance path 120 joins the first conveyance path 118 at an upstream joining point 121 in the sheet conveyance direction from the readout unit 106. In other words, the second conveyance path 120 joins the first conveyance path 118 at the joining point 121 between the sheet feeding cassette 102 and the readout unit 106.

Accordingly, the second conveyance path 120 conveys the sheet, which is conveyed from the readout unit 106, to the readout unit 106 again through the erasing unit 108.

The image erasing apparatus 100 controls the first branch member 124 to convey the sheet, which is fed from the sheet feeding member 104, to the readout unit 106, the erasing unit 108, and the readout unit 106, in this order.

The first conveyance path 118 includes the second branch member 126 as a switching member for switching the conveyance direction of the sheet. The second branch member 126 is provided at a downstream position in the sheet conveyance direction from the first branch member 124. The second branch member 126 guides the sheet, which is conveyed from the first branch member 124, to the reuse box 110 or the third conveyance path 122. The third conveyance path 122 conveys the sheet to the reject box 112.

The erasing unit 108 erases the image on the sheet to be conveyed. For example, the erasing unit 108 heats the image on the sheet to a predetermined temperature or more in a state of coming in contact with the sheet to be conveyed. The erasing unit 108 erases the image by heating the image on the sheet and decoloring the erasable color material which forms the image. Hereinafter, the predetermined temperature is referred to as an erasing temperature.

For example, the erasing unit 108 of the image erasing apparatus 100 according to the first embodiment includes a first erasing unit 108A which erases the image on the first surface of the sheet and a second erasing unit 108B which erases the image on the second surface of the sheet.

A first erasing unit 108A includes a first heating roller 108H having a heater, a first heating roller temperature sensor 109A which detects a temperature of the first heating roller 108H, and a first driven roller. The first heating roller 108H and the first driven roller are disposed so as to face each other with the second conveyance path therebetween.

The second erasing unit 108B includes a second heating roller 108I having a heater, a second heating roller temperature sensor 109B which detects a temperature of the second heating roller 108I, and a second driven roller.

Hereinafter, the first heating roller temperature sensor 109A and the second heating roller temperature sensor 109B are referred to as a heating roller temperature sensor.

The second heating roller 108I and the second driven roller are disposed so as to face each other with the second conveyance path therebetween.

The first heating roller 108H and the second heating roller 108I are disposed at sides opposite to each other with the second conveyance path therebetween.

The first heating roller 108H abuts on one surface of the sheet to heat the image on the sheet. The second heating roller 108I abuts on the other surface of the sheet to heat the image on the sheet. Accordingly, the erasing unit 108 erases the images on both surfaces of the sheet to be conveyed, in a single conveyance.

The operation unit 128 is disposed at a top of the image erasing apparatus 100 body. The operation unit 128 includes a touch panel display unit and various operation keys.

The operation keys include, for example, a ten key, a stop key, and a start key or the like. The user operates the operation unit 128 to command a function operation of the erasing apparatus 100 such as erasing start or readout of the image on the sheet. In other words, the operation unit 128 receives the command such as the erasing start or the readout of the image on the sheet by the user.

The operation unit 128 displays setting information or operation status of the image erasing apparatus 100, log information, or a message to the user on a display unit. The operation unit 128 is disposed in the image erasing apparatus 100 body, but is not limited thereto. For example, the operation unit 128 may be an operation unit of an external device connected to the image erasing apparatus 100 through a network and may be configured to operate the image erasing apparatus 100 from the external device. Moreover, the operation unit 128 is an independent form from the image erasing apparatus 100 body and may be configured to operate the image erasing apparatus 100 by wire or wireless communication. The operation unit 128 according to the first embodiment may command the processing or browse information and the like with respect to the image erasing apparatus 100.

The discharge members 114 and 116 discharge the sheet to the reuse box 110 or the reject box 112. The reuse box 110 and the reject box 112 are vertically juxtaposed at a bottom of the image erasing apparatus 100 body. For example, the reuse box 110 accommodates the sheets, which are reusable by the erasing of the image, in a stacked state. The reject box 112 accommodates the sheets, which are determined as non-reusable, in a stacked state.

The sheet conveying path is appropriately changed based on processing modes to be executed by the image erasing apparatus 100. The image erasing apparatus 100 includes a plurality of processing modes. For example, the image erasing apparatus 100 includes (1) a first erasing mode which executes only an erasing processing without performing an image readout processing before and after the erasing processing, (2) a second erasing mode which executes the erasing processing after the image is read out, (3) a third erasing mode which executes the image readout processing after erasing processing without performing the image readout processing before the erasing processing to determine whether the sheet is reusable and then perform a separation processing between the reusable sheet and the non-reusable sheet, (4) a fourth erasing mode which executes the erasing processing after the image readout processing and further executes the separation processing, and (5) a readout mode which executes the image readout processing without performing the erasing processing.

The user can operate the operation unit 128 of the image erasing apparatus 100 to select each of the processing modes described above. Moreover, each of the processing modes may be selected from an external terminal without being limited to the operation unit 128 of the image erasing apparatus 100. In the first to fourth erasing modes, the sheet is necessarily conveyed to the erasing unit 108.

On the other hand, in the readout mode, the image erasing apparatus 100 controls the first branch member 124 to discharge the sheet to the reuse box 110 or the reject box 112 through the readout unit 106 without conveying to the erasing unit 108.

The image erasing apparatus 100 includes a plurality of sheet detection sensors 130 to 133 which detect the sheet to be conveyed through the first to third conveyance paths 118, 120, and 122.

The sheet feeding cassette 102 may include an identification unit 222 including sheet feeding cassette identification information ID to identify the sheet feeding cassette 102. For example, the identification unit 222 may be a protrusion portion for indicating the sheet feeding cassette identification information ID or may be a radio tag. The sheet feeding cassette identification information ID is used as a first authentication information ID, which will be described below, to authenticate the user who uses the image erasing apparatus 100.

When the sheet feeding cassette 102 includes the identification unit 222, the image erasing apparatus 100 includes a detection unit 221 in the mounting portion of the sheet feeding cassette 102 to read out the identification unit 222. The detection unit 221 includes an actuator when the identification unit 222 is the protrusion portion. The detection unit 221 includes a radio tag reader/writer when the identification unit 222 is the radio tag. The detection unit 221 is connected to the control unit 200.

Figure 2:
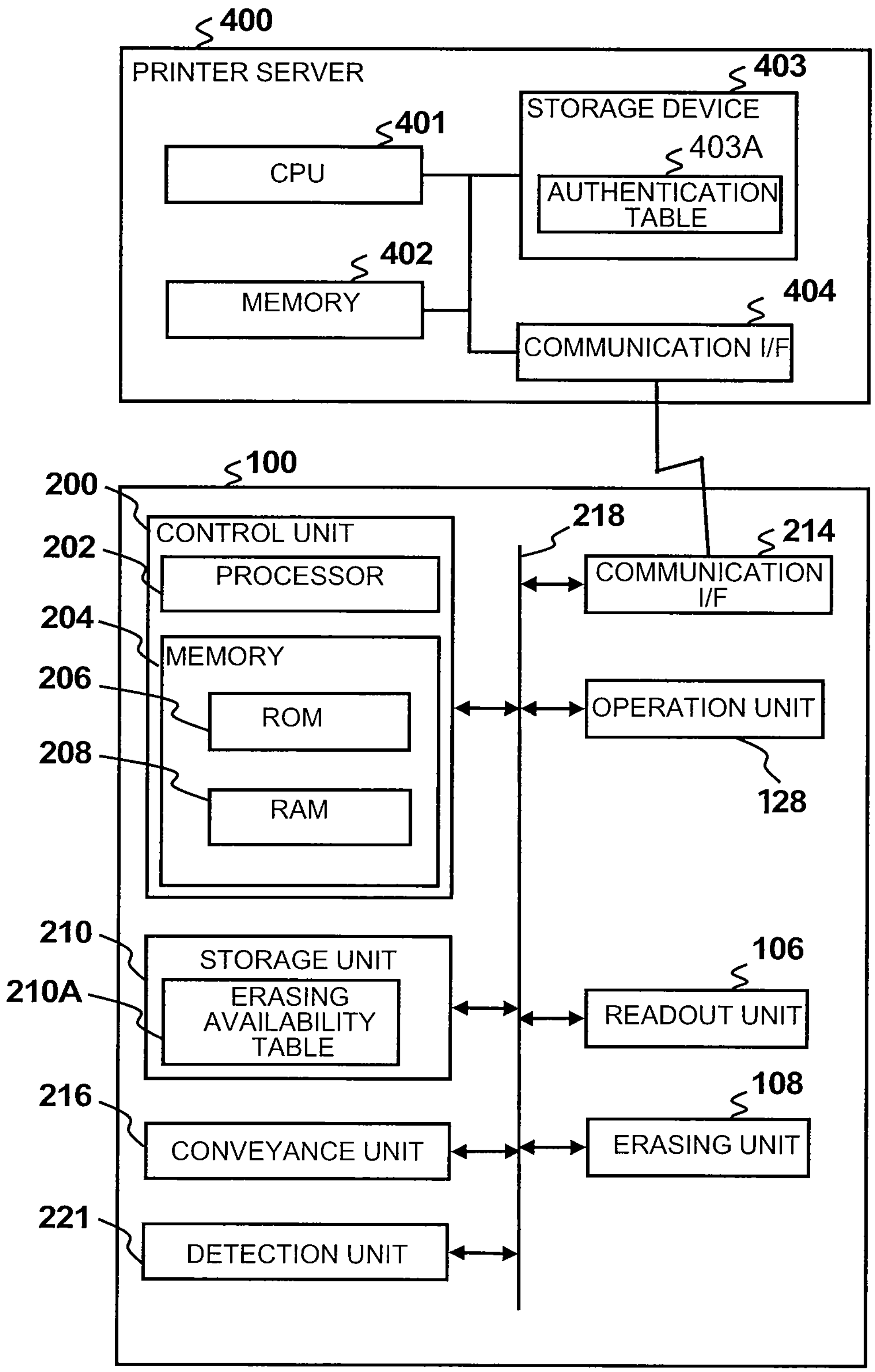
FIG. 2 is a block diagram illustrating a control configuration of the image erasing apparatus according to the first embodiment.

FIG. 2 is a block diagram illustrating a control configuration of the image erasing apparatus 100. The image erasing apparatus 100 includes the control unit 200, the storage unit 210, the detection unit 221, a communication interface (communication I/F) 214, a conveyance unit 216, the readout unit 106, the erasing unit 108, and the operation unit 128.

The control unit 200 includes a processor 202 such as a central processing unit (CPU) and a memory 204 as a storage device.

The control unit 200 controls the readout unit 106, the erasing unit 108, and the operation unit 128. The memory 204 is, for example, a semiconductor memory and includes a read only memory (ROM) 206 which stores various control programs and a random access memory (RAM) 208 which provides a transient operation region to the processor 202.

For example, the ROM 206 stores an image printing rate used as a threshold value for determining whether the sheet is reusable and a density threshold value for determining whether the image on the sheet is erased. The RAM 208 may temporarily store the image read out by the readout unit 106. Each configuration of the image erasing apparatus 100 is connected to each other through a bus 218.

For example, the control unit 200 controls the readout unit 106, the erasing unit 108, and other configurations according to the processing modes (1) to (5) selected through the operation unit 128 by the user.

For example, when the first to fourth erasing modes are selected by the user, the control unit 200 allows the erasing unit 108 to erase the image on the sheet. In the second erasing mode and the fourth erasing mode, the readout unit 106 reads out the image on the sheet before the sheet is conveyed to the erasing unit 108. The control unit 200 stores data of the image, which is read out by the readout unit 106, in the storage unit 210.

The control unit 200 may determine whether prohibition data to be prohibited from the erasing of confidential data and the like is contained in the data of the image read out by the readout unit 106.

Moreover, the control unit 200 may determine whether the printing rate of the image, which is read out by the readout unit 106, exceeds the threshold value. When the prohibition data is contained in the data of the image, or when the printing rate of the image exceeds the threshold value, the control unit 200 controls the conveyance unit 216 to convey the sheet to the reject box 112.

When the prohibition data is not contained in the data of the image, or when the printing rate of the image does not exceed the threshold value, after the image on the sheet is read out by the readout unit 106, the control unit 200 controls the conveyance unit 216 to convey the sheet to the erasing unit 108.

Moreover, in the third erasing mode and the fourth erasing mode, after the erasing unit 108 erases the image on the sheet, the readout unit 106 reads out the image on the sheet after the erasing processing. The control unit 200 determines whether the sheet is reusable based on the data of the image, which is read out by the readout unit 106.

The control unit 200 determines a sheet conveying destination after the erasing processing based on a result from determining whether the sheet is reusable. The separation processing for determining whether the sheet is reusable after the erasing processing includes a processing for determining whether the image is present on the sheet after the erasing processing. For example, when the image, which remains without being erased, is present on the sheet after the erasing processing, the control unit 200 determines that the sheet after the erasing processing is non-reusable for the reason that the remaining image is present after the erasing, based on the readout result of the readout unit 106. The separation processing includes a processing in which the control unit 200 determines the presence or absence of sheet folding, a wrinkle depth, or the presence or absence of hole based on the image read out by the readout unit 106 and determines whether the sheet is reusable.

The control unit 200 determines the present or absence of the sheet in the sheet feeding cassette 102 based on a signal from the detection sensor 103. Moreover, the control unit 200 perceives the temperature of the first heating roller 108H and the second heating roller 108I based on temperature detection result of the heating roller temperature sensors 109A and 109B and controls the temperature of the first heating roller 108H and the second heating roller 108I.

Moreover, the control unit 200 perceives the position of the sheet in the first to third conveyance paths 118, 120, and 122 using the sheet detection sensors 130 to 133.

The storage unit 210 stores the data of the image read out by the readout unit 106. Moreover, the storage unit 210 stores the number of sheets which are processed by the image erasing apparatus 100. The storage unit 210 may be, for example, a hard disk drive or other magnetic storage device, an optical storage device, a semiconductor storage device such as a flash memory, or any combination of these storage devices.

For example, the storage unit 210 may include an erasing availability table 210A which stores information on erasing availability of the image to be printed by the image forming apparatus and information on erasing temperature, for each identification information indicating the image forming apparatus which prints the image on the sheet. The control unit 200 acquires the identification information of the image forming apparatus, which prints the image on the sheet, from the input through the operation unit 128 by the user or the readout result by the readout unit 106. The control unit 200 searches the erasing availability table 210A based on the acquired identification information and acquires the erasing availability information of the image printed on the sheet. Furthermore, the control unit 200 acquires the information on the erasing temperature from the erasing availability table 210A and controls the erasing unit 108 when the image printed on the sheet is erasable.

The image erasing apparatus 100 includes a communication I/F 214 which is an interface connecting to the external device.

The conveyance unit 216 includes a plurality of conveyance rollers and conveyance motors for driving the conveyance rollers which are disposed on the first conveyance path 118, the second conveyance path 120, and the third conveyance path 122. The control unit 200 controls the driving of the conveyance motors of the conveyance unit 216 to control a conveyance speed of the sheet. A readout speed indicates a conveyance speed of the sheet to be conveyed to the readout unit 106 for reading out the image on the sheet. An erasing speed indicates a conveyance speed of the sheet to be conveyed to the erasing unit 108 for erasing the image on the sheet.

The image erasing apparatus 100 is connected to a printer server 400 through, for example, the communication I/F 214. The printer server 400 includes a CPU 401, a memory 402, a storage device 403, and a communication I/F 404.

The storage device 403 includes an authentication table 403A which stores the authentication information for authenticating the user of the image erasing apparatus 100. The authentication information includes a first authentication information ID which is uniquely allocated to the user in advance and a second authentication information PA which is determined corresponding to the first authentication information ID. The authentication table 403A stores the second authentication information PA and other types of user information for each the first authentication information ID. The first authentication information ID is, for example, a character string indicating a user name. The second authentication information PA is, for example, a character string indicating a password.

FIG. 3 is a diagram illustrating a data configuration of the authentication table 403A. As illustrated in FIG. 3, the authentication table 403A stores the first authentication information "ID" and the second authentication information "PA". Moreover, the authentication table 403A stores a "e-mail address" of the user as other types of user information, a "department code" indicating a department to which the user belongs, and "the number of erased sheets" indicating the number of sheets which are erased by the user.

As an example of each data, the first authentication information ID is "1000123" in user name, the second authentication information PA is "123456" in password, the e-mail address is "abc@cdf.com", the department code is "001", and the number of erased sheets is "102".

Figure 4:
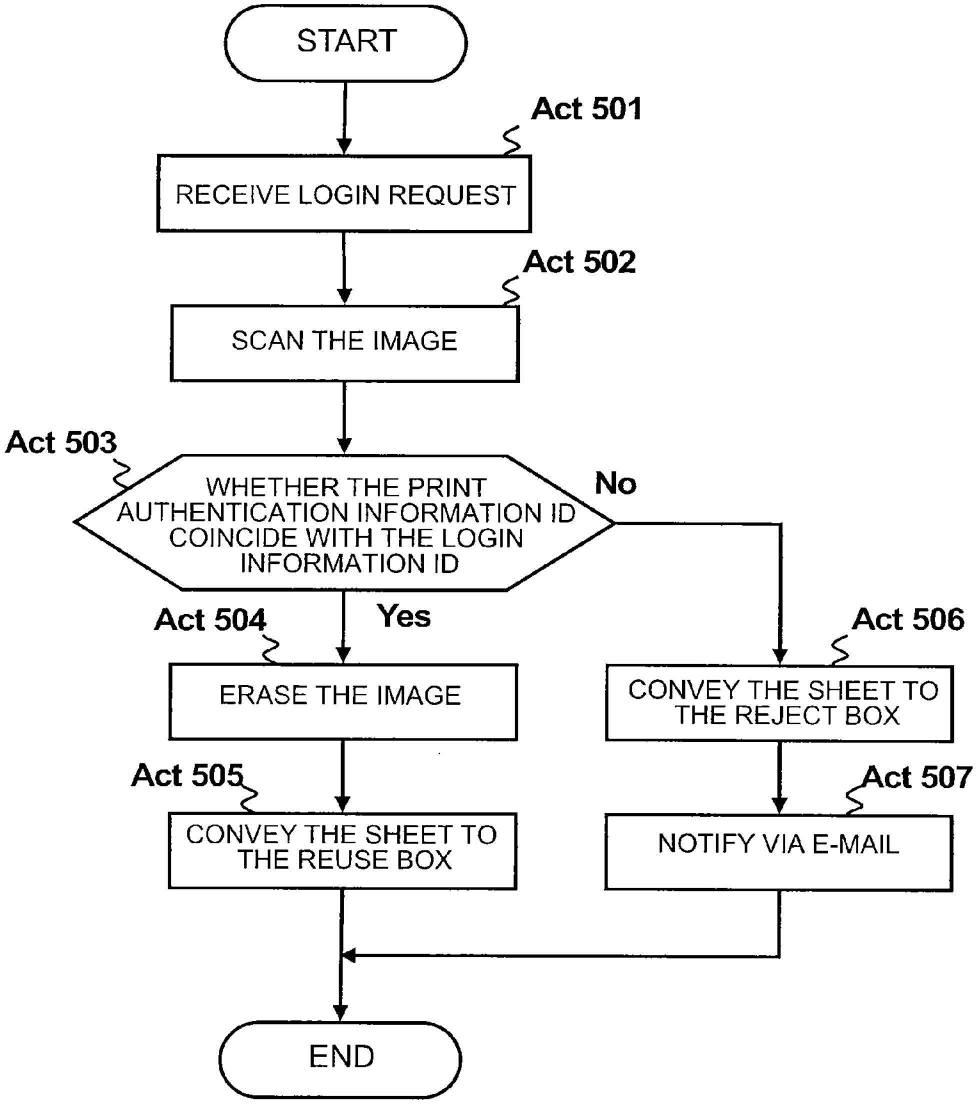
FIG. 4 is a flowchart illustrating a control operation of the image erasing apparatus according to the first embodiment.

FIG. 4 is a flowchart illustrating a control operation of the image erasing apparatus 100. As illustrated in FIG. 4, in Act 501, the image erasing apparatus 100 inputs the login request of the user from the operation unit 128. In other words, the operation unit 128 receives the login request from the user. Specifically, when receiving the input of the first authentication information ID from the user, the operation unit 128 displays an input request of the password of the second authentication information PA on the display unit. When the operation unit 128 receives the input of the password from the user, the control unit 200 of the image erasing apparatus 100 transmits the first authentication information ID, which is input by the user, to the printer server 400 through the communication I/F 214 and also transmits a transmission request of the password of the second authentication information PA stored in the authentication table 403A.

The printer server 400 searches the authentication table 403A based on the first authentication information ID received from the image erasing apparatus 100 and reads out the password of the second authentication information PA. The printer server 400 transmits the first authentication information ID and the password to the image erasing apparatus 100 through the communication I/F 214.

The control unit 200 of the image erasing apparatus 100 determines whether the password of the second authentication information PA input by the user coincides with the password of the second authentication information PA received from the printer server. When the control unit 200 determines that the password input by the user coincides with the password received from the printer server 400, the login of the user is accepted. As will be described in detail, the control unit 200 allows the readout unit 106 to perform the readout processing of the image printed on the sheet. When the control unit 200 determines that the password input by the user does not coincide with the password received from the printer server 400, the control unit 200 allows the display unit of the operation unit 128 to display a re-input request of the password of the second authentication information PA.

Moreover, in a case where the sheet feeding cassette 102 includes the identification unit 222 and the image erasing apparatus 100 includes the detection unit 221, when the sheet feeding cassette 102 is mounted in the image erasing apparatus 100 by the user, the detection unit 221 detects the identification unit 222 of the sheet feeding cassette 102. The detection unit 221 detects the identification unit 222 of the sheet feeding cassette 102 to read out the sheet feeding cassette identification information ID indicated by the identification unit 222. When the detection unit 221 reads out the sheet feeding cassette identification information ID, the operation unit 128 displays the input request of the password of the second authentication information PA on the display unit. When the operation unit 128 receives the input of the password from the user, the control unit 200 of the image erasing apparatus 100 transmits the sheet feeding cassette identification information ID to the printer server 400, instead of the first authentication information ID input by the user. Moreover, the control unit 200 transmits the transmission request of the password of the second authentication information PA which is stored in the authentication table 403A. That is, the control unit 200 acquires the sheet feeding cassette identification information ID as the first authentication information ID input by the user, based on the detection result of the detection unit 221.

When the sheet feeding cassette 102 includes the identification unit 222, the printer server 400 stores in advance the sheet feeding cassette identification information ID in the authentication table 403A, instead of the first authentication information ID input by the user.

The printer server 400 searches the authentication table 403A based on the sheet feeding cassette identification information ID as the first authentication information ID received from the image erasing apparatus 100 and reads out the password of the second authentication information PA. The printer server 400 transmits the readout password to the image erasing apparatus 100.

The control unit 200 of the image erasing apparatus 100 determines whether the password of the second authentication information PA input by the user coincides with the password of the second authentication information PA received from the printer server 400. When the control unit 200 determines that the password input by the user coincides with the password received from the printer server 400, the login of the user is accepted. As will be described in detail, the control unit 200 allows the readout unit 106 to perform the readout processing of the image printed on the sheet. When the control unit 200 determines that the password input by the user does not coincide with the password received from the printer server 400, it allows the display unit of the operation unit 128 to display a re-input request of the password of the second authentication information PA.

In Act 502, the control unit 200 of the image erasing apparatus 100 allows the readout unit 106 to read out the image printed on the sheet. Specifically, the control unit 200 controls the conveyance unit 216 to take out the sheet from the sheet feeding cassette 102 and convey the sheet to the readout unit 106. The readout unit 106 scans the sheet to read out print authentication information ID which is contained in the image printed on the sheet.

The print authentication information ID is authentication information ID of the user who prints the image on the sheet. The print authentication information ID is printed as apart of image when the image is printed on the sheet. The print authentication information ID may be a bar-code or a character string. Moreover, the print authentication information ID is printed by the erasable color material.

In Act 503, the control unit 200 of the image erasing apparatus 100 determines whether the print authentication information ID coincides with the first authentication information ID or the sheet feeding cassette identification information ID which is input by the user. Hereinafter, the first authentication information ID and the cassette ID, which are input by the user, are called login information ID. When the control unit 200 determines that the print authentication information ID coincides with the login information ID, the operation of the image erasing apparatus 100 proceeds to Act 504. When the control unit 200 determines that the print authentication information ID does not coincide with the login information ID, the operation of the image erasing apparatus 100 proceeds to Act 506.

In Act 504, the control unit 200 of the image erasing apparatus 100 allows the erasing unit 108 to erase the image printed on the sheet. Specifically, the control unit 200 controls the conveyance unit 216 to convey the sheet to the erasing unit 108. The erasing unit 108 erases the image on the sheet. Moreover, the control unit 200 transmits the first authentication information ID of the login information ID and a signal indicating an erasing completion to the printer server 400.

The printer server 400 reads out the number of erased sheets of the first authentication information ID, which is the login information ID received from the image erasing apparatus 100, from the authentication table 403A. The server 400 stores the number of erased sheets, which is newly obtained by adding one to the read number of erased sheets, in the authentication table 403A.

In Act 505, the control unit of the image erasing apparatus 100 controls the conveyance unit 216 to convey the sheet after the erasing processing to the reuse box 110.

In Act 506, the control unit 200 of the image erasing apparatus 100 controls the conveyance unit 216 to convey the sheet to the reject box 112.

In Act 507, the control unit 200 of the image erasing apparatus 100 notifies the user, who is specified by the print authentication information ID, that the sheet is accommodated in the reject box 112. Specifically, the control unit 200 transmits the print authentication information ID to the printer server 400 and also transmits the transmission request of the e-mail address to the printer server 400.

The printer server 400 searches the authentication table 403A based on the print information ID received from the image erasing apparatus 100 and reads out the e-mail address. The printer server 400 transmits the read out e-mail address to the image erasing apparatus 100.

The control unit 200 of the image erasing apparatus 100 transmits an e-mail attached with a message of intent to the effect that the image on the sheet is accommodated in the reject box 112 without being erased, to the e-mail address received from the printer server 400.

In the first embodiment, the storage device 403 of the printer server 400 is configured to have the authentication table 403A, but, for example, the storage unit 210 may be configured to include the authentication table 403A. When the storage unit 210 includes the authentication table 403A, the control unit 200 is not required to transmit and receive the authentication information to and from the printer server 400. Specifically, in Act 501, the control unit 200 is not required to transmit the transmission request of the password, which is the second authentication information PA, to the printer server 400 through the communication I/F 214.

The control unit 200 searches the authentication table 403A of the storage unit 210 based on the first authentication information ID input by the user and reads out the password of the second authentication information PA. The control unit 200 determines whether the password of the second authentication information PA input by the user coincides with the password of the second authentication information PA read out by the authentication table 403A of the storage unit 210. When the control unit 200 determines that the password input by the user coincides with the password readout by the authentication table 403A of the storage unit 210, it allows the readout unit 106 to perform the readout processing of the image printed on the sheet. Furthermore, when the control unit 200 determines that the password input by the user does not coincide with the password read out by the authentication table 403A of the storage unit 210, it allows the display unit of the operation unit 128 to display the re-input request of the password of the second authentication information PA.

Furthermore, even in using the sheet feeding cassette identification information ID as the first authentication information ID input by the user, the control unit 200 is not required to transmit the transmission request of the password, which is the second authentication information PA, to the printer server 400 through the communication I/F 214 in a manner similar to the above. The authentication table 403A of the storage unit 210 stores the sheet feeding cassette identification information ID instead of the first authentication information ID. The control unit 200 searches the authentication table 403A of the storage unit 210 based on the sheet feeding cassette identification information ID as the first authentication information ID to read out the password of the second authentication information PA.

As described above, the image erasing apparatus 100 according to the first embodiment includes the readout unit 106 which reads out the authentication information of the user who prints the image being contained in the image printed on the sheet, the erasing unit 108 which erases the image printed on the sheet, and the control unit 200 which acquires the authentication information of the user who uses the apparatus and determines whether the acquired authentication information coincides with the read out authentication information to allow the erasing unit to erase the image in determining to coincide with each other.

Therefore, according to the first embodiment, it is possible to restrict the use of the image erasing apparatus 100 for each user.

Figure 5:
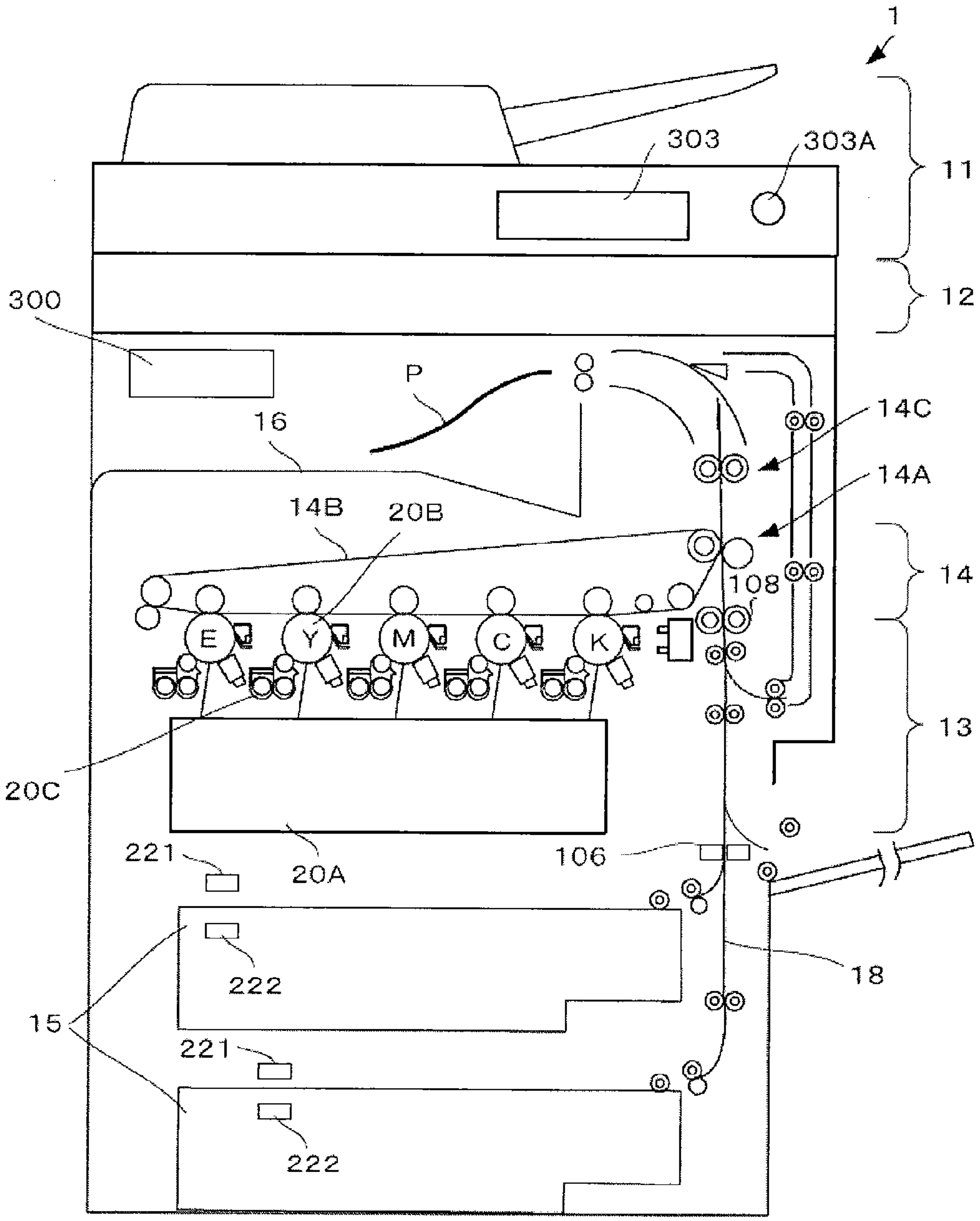
FIG. 5 is a cross-sectional view illustrating an image forming apparatus according to a second embodiment.

FIG. 5 is a cross-sectional view illustrating an image forming apparatus according to a second embodiment. An image forming apparatus 1 incorporates the image erasing apparatus. As illustrated in FIG. 5, the image forming apparatus 1 includes a control unit 300, an operation unit 303, a start button 303A, an automatic document feeder 11, a scanner 12, an image forming unit 13, a transfer unit 14, a sheet conveyance mechanism 18, and a sheet feeding unit 15.

The operation unit 303 includes a touch panel as an input/output portion receiving a user's operation by, for example, a Graphical User Interface (GUI) system.

The start button 303A receives a pressing operation by the user to output a signal of intent to start the image formation to the control unit 300.

The automatic document feeder 11 is installed openably and closably at a top of the image forming apparatus 1 body. The automatic document feeder 11 includes a document conveying mechanism which takes out documents one by one from a sheet feed tray and conveys the taken document to a sheet discharging tray.

The automatic document feeder 11 conveys the documents one by one to the document readout portion of the scanner 12 by the document conveying mechanism. The automatic document feeder 11 is openably and closably supported on a document platen of the scanner 12. Accordingly, the user opens the automatic document feeder 11 and can place the document on the document platen of the scanner 12.

The scanner 12 includes a carriage provided with an exposure lamp which exposes the document and a first reflective mirror, a plurality of second reflective mirrors which moves according to the movement of the carriage, a lens block, a Charge Coupled Device (CCD) as an image readout sensor.

The carriage stops at the document readout portion or moves along the document platen to reflect light reflected from the document to the first reflective mirror. The plurality of second reflective mirrors reflects light reflected from the first reflective mirror to the lens block. The lens block changes magnification of the reflected light to project the reflected light onto the CCD. The CCD converts incident light into an electrical signal and then outputs the converted light to the image forming unit 13, as an image signal.

The image forming unit 13 forms the image using an inerasable toner (general toner) and an erasable toner as a color material. The inerasable toner includes, for example, a yellow toner Y, a magenta toner M, a cyan toner C, or a black toner K. The erasable toner includes, for example, a black toner E. The image forming unit 13 includes a laser irradiation unit 20A which irradiates a photosensitive drum 20B as an electrostatic latent image carrier with laser light with respect to each the inerasable toners of four colors Y, M, C, and K and the erasable toner E. Furthermore, the image forming unit 13 includes five process units 307 including the photosensitive drum 20B and the developing unit 20 or the like with respect to each the inerasable toners of four colors Y, M, C, and K and the erasable toner E.

The erasable toner E includes a coloring compound, a color developing agent, and a decolorizing agent. An example of the coloring compound may be a leuco dye. An example of the color developing agent may be phenols. The decolorizing agent may include a substance which is compatible with the coloring compound when being heated and has no affinity with the color developing agent.

The erasable toner E produces a color by an interaction between the coloring compound and the color developing agent and is decolored by the heating to an erasing temperature or more such that the interaction between the coloring compound and the color developing agent is finished.

The laser irradiation unit 20A irradiates the photosensitive drum 20B with the laser light based on the image signal to form an electrostatic latent image on the photosensitive drum 20B. The image signal includes a signal of the image indicating the print authentication information ID. As in the first embodiment, the print authentication information ID is authentication information for authenticating the user who prints the image. The developing unit 20C supplies the toner to the photosensitive drum 20B and forms the toner image from the electrostatic latent image.

The sheet feeding unit 15 includes an upper-stage sheet feeding cassette and a lower-stage sheet feeding cassette. The sheet feeding unit 15 takes out the sheets one by one from the upper-stage sheet feeding cassette or the lower-stage sheet feeding cassette to guide the taken sheet to the sheet conveyance mechanism 18. The sheet conveyance mechanism 18 conveys the sheet to the transfer unit 14. For example, the upper-stage sheet feeding cassette accommodates the sheet on which the image is formed, and the lower-stage sheet feeding cassette accommodates the sheet on which the image is not formed or the image is erased.

The transfer unit 14 includes a transfer roller 14A and a transfer belt 14B. The transfer belt 14B as an image carrier transfers a toner image onto the surface of the belt from the photosensitive drum 20B. The transfer belt 14B carries the transferred toner image and conveys the toner image up to the position of the transfer roller 14A. As a voltage is applied, the transfer roller 14A transfers the toner image onto the sheet being conveyed from the transfer belt 14B.

The image forming apparatus 1 includes a fixing unit 14C at a downstream position in the sheet conveyance direction from the transfer roller 14A. The fixing unit 14C heats and pressurizes the toner image to fix it on the sheet. As the toner image is fixed on the sheet, the image is printed on the sheet. The printed image contains the print authentication information ID.

A fixed sheet P is discharged to a sheet discharging tray 16 from a sheet discharging port of the image forming apparatus 1. The sheet discharging tray 16 accommodates the sheets in a stacked state.

Furthermore, the sheet discharging tray 16 includes the reuse box which accommodates the sheet on which the erasing processing is performed and the reject box which accommodates the sheet on which the erasing processing is not performed.

The image forming apparatus 1 includes the image erasing apparatus at an upper position in the sheet conveyance direction from the transfer roller 14A or at a lower position in the sheet conveyance direction from the sheet feeding unit 15. As in the first embodiment, the image erasing apparatus includes the readout unit 106 and the erasing unit 108. The readout unit 106 and the erasing unit 108 are disposed along the sheet conveyance direction in this order.

As in the first embodiment, the sheet feeding cassette 102 mounted in the sheet feeding unit 15 may include the identification unit 222 including the sheet feeding cassette identification information ID to identify the sheet feeding cassette 102. For example, the identification unit 222 may be the protrusion portion for indicating the sheet feeding cassette identification information ID or may be a radio tag. As in the first embodiment, the cassette identification information ID is used as the first authentication information ID of the user who uses the image forming apparatus 1.

When the sheet feeding cassette 102 includes the identification unit 222, the image forming apparatus 1 includes the detection unit 221 at the mounting position of the sheet feeding cassette 102 to read out the identification unit 222. The detection unit 221 includes the actuator when the identification unit 222 is the protrusion portion. The detection unit 221 includes the radio tag reader/writer when the identification unit 222 is the radio tag. The detection unit 221 is connected to the control unit 200.

Figure 6:
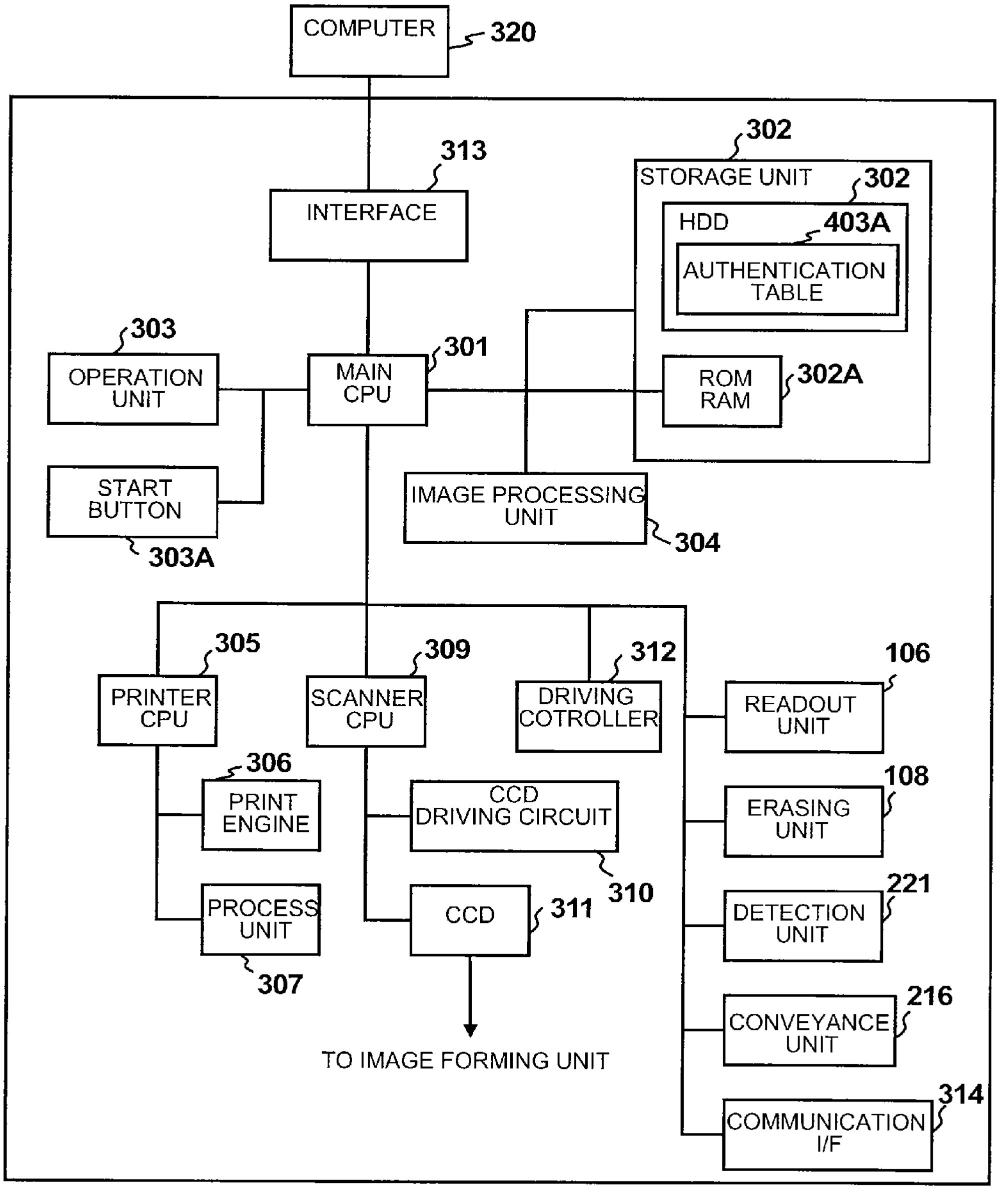
FIG. 6 is a block diagram illustrating a control configuration of the image forming apparatus according to the second embodiment.

FIG. 6 is a block diagram illustrating a control configuration of the image forming apparatus 1. As illustrated in FIG. 6, the image forming apparatus 1 includes a main CPU 301. Moreover, the image forming apparatus 1 includes an operation unit 303 connected to the main CPU 301, a storage unit 302, a start button 303A, and an image processing unit 304 which performs the image processing. The main CPU 301 is a computing device of the control unit 300 which collectively controls the entire image forming apparatus 1. The storage unit 302 includes a ROM, a RAM 302A, and a hard disk drive 302B (hereinafter, the hard disk drive is referred to as an HDD) which are a storage device.

The main CPU 301 is connected to a computer 320 as an external device through the interface 313. Furthermore, the main CPU 301 is connected to a printer CPU 305, a scanner CPU 309, and a driving controller 312. The printer CPU 305 controls each configuration related to the image formation based on the command of the main CPU 301. The scanner CPU 309 controls each configuration related to the image readout based on the command by the main CPU 301. The driving controller 312 controls a driving portion of the image forming apparatus 1 based on the command of the main CPU 301.

Specifically, the printer CPU 305 controls a print engine 306 forming the electrostatic latent image on the photosensitive drum 20B and a process unit 307 forming the toner image.

Specifically, the scanner CPU 309 controls a CCD driving circuit 310 which drives the CCD 211. The CCD 311 outputs the image signal to the image forming unit 13.

Moreover, the main CPU 301 is connected to the readout unit 106, the erasing unit 108, the conveyance unit 216, the detection unit 221, and a communication I/F 314. Hereinafter, the main CPU 301 is simply referred to as the control unit 300.

The control unit 300 perceives the temperature of the first heating roller 108H and the second heating roller 108I based on the temperature detection result of the heating roller temperature sensors 109A and 109B. The control unit 300 perceives the temperature of the first heating roller 108H and the second heating roller 108I to control the temperature of the first heating roller 108H and the second heating roller 108I.

The storage unit 302 stores the data of the image which is read out by the readout unit 106. Moreover, the storage unit 302 stores the number of sheets on which the erasing processing is performed.

As in the first embodiment, the HDD 302B includes the authentication table 403A which stores the authentication information for authenticating the user of the image forming apparatus 1. As in the first embodiment, the authentication information includes the first authentication information ID which is uniquely allocated to the user in advance and the second authentication information PA which is determined corresponding to the first authentication information ID. The authentication table 403A stores the second authentication information PA and other types of user information for each the first authentication information ID. As illustrated in FIG. 3, the first authentication information ID is, for example, the character string indicating the user name. The second authentication information PA is, for example, the character string indicating the password.

The control operation of the image forming apparatus 1 is the similar to the operation of the image erasing apparatus 100 except for the transmission and reception to/from the printer server 400. Accordingly, the control operation of the image forming apparatus 1 will be described with reference to FIG. 4.

In Act 501, the image forming apparatus 1 inputs the login request of the user from the operation unit 303. In other words, the operation unit 303 receives the login request from the user. Specifically, when receiving the first authentication information ID input from the user, the operation unit 303 displays the input request of the password of the second authentication information PA on the display unit. The operation unit 303 receives the input of the password from the user.

The control unit 300 of the image forming apparatus 1 searches the authentication table 403A based on the first authentication information ID input by the user and reads out the password of the second authentication information PA which is stored in advance in the authentication table 403A.

The control unit 300 of the image forming apparatus 1 determines whether the password of the second authentication information PA input by the user coincides with the password of the read second authentication information PA. When the control unit 300 determines that the password input by the user coincides with the read password, the login of the user is accepted. As will be described in detail, the control unit 300 allows the readout unit 106 to perform the readout processing of the image printed on the sheet. When the control unit 300 determines that the password input by the user does not coincide with the read password, it allows the display unit of the operation unit 303 to display the re-input request of the password of the second authentication information PA.

Moreover, when the sheet feeding cassette includes the identification unit 222 and when the image forming apparatus 1 has the detection unit 221, the image forming apparatus 1 stores in advance the sheet feeding cassette identification information ID in the authentication table 403A, instead of the first authentication information ID input by the user.

When the sheet feeding cassette is mounted in the sheet feeding unit 15 by the user, the detection unit 221 detects the identification unit 222 of the sheet feeding cassette. The detection unit 221 detects the identification unit 222 of the sheet feeding cassette to read out the sheet feeding cassette identification information ID indicated by the identification unit 222. The detection unit 221 reads out the sheet feeding cassette identification information ID and the operation unit 303 displays the input request of the password of the second authentication information PA on the display unit. The operation unit 303 receives the input of the password from the user. Furthermore, the control unit 300 of the image forming apparatus 1 searches the authentication table 403A based on the read out sheet feeding cassette identification information ID as the first authentication information ID to read out the password of the second authentication information PA stored in the authentication table 403A.

The control unit 300 of the image forming apparatus 1 determines whether the password of the second authentication information PA input by the user coincides with the password of the read second authentication information PA. When the control unit 300 determines that the password input by the user coincides with the read password, the login of the user is accepted. When the control unit 300 determines that the password input by the user does not coincide with the read password, it allows the display unit of the operation unit 303 to display the re-input request of the password of the second authentication information PA.

In Act 502, the control unit 300 of the image forming apparatus 1 allows the readout unit 106 to read out the image printed on the sheet. Specifically, the control unit 300 controls the conveyance unit 216 to take out the sheet from the sheet feeding cassette of the sheet feeding unit 15 and convey the sheet to the readout unit 106. The readout unit 106 scans the sheet to read out the print authentication information ID which is contained in advance in the image formed on the sheet.

As in the first embodiment, the print authentication information ID is the authentication information for authenticating the user who prints the image on the sheet. The print authentication information ID is printed on the sheet as a part of image when the image is printed on the sheet. The print authentication information ID may be a bar-code or a character string. Moreover, the print authentication information ID is printed by the erasable color material.

In Act 503, the control unit 300 of the image forming apparatus 1 determines whether the print authentication information ID coincides with the first authentication information ID or the sheet feeding cassette identification information ID which is input by the user. Hereinafter, the first authentication information ID and the sheet feeding cassette identification information ID, which are input by the user, are called login information ID. When the control unit 300 determines that the print authentication information ID coincides with the login information ID, the operation of the image forming apparatus 1 proceeds to Act 504. When the control unit 300 determines that the print authentication information ID does not coincide with the login information ID, the operation of the image forming apparatus 1 proceeds to Act 506.

In Act 504, the control unit 300 of the image forming apparatus 1 allows the erasing unit 108 to erase the image printed on the sheet. Specifically, the control unit 300 controls the conveyance unit 216 to convey the sheet to the erasing unit 108. The erasing unit 108 erases the image on the sheet.

The control unit 300 of the image forming apparatus 1 reads out the number of erased sheets of the first authentication information ID, which is the login information ID from the authentication table 403A. The control unit 300 stores the number of erased sheets, which is newly obtained by adding one to the read number of erased sheets, in the authentication table 403A.

In Act 505, the control unit 300 of the image forming apparatus 1 controls the conveyance unit 216 to convey the sheet after the erasing processing to the reuse box of the sheet discharging tray 16.

In Act 506, the control unit 300 of the image forming apparatus 1 controls the conveyance unit 216 to convey the sheet to the reject box of the sheet discharging tray 16.

In Act 507, the control unit 300 of the image forming apparatus 1 searches the authentication table 403A based on the print authentication information ID which is the first authentication information ID and reads out the e-mail address.

The control unit 300 of the image forming apparatus 1 transmits an e-mail attached with a message of intent to the effect that the image on the sheet is accommodated in the reject box without being erased, to the read e-mail address.

As described above, the image forming apparatus 1 according to the second embodiment includes the image forming unit which prints the image containing the authentication information of the user, who prints the image, on the sheet, the readout unit which reads out the authentication information of the user who prints the image, the authentication information of the user being contained in the image printed on the sheet, the erasing unit which erases the image printed on the sheet, and the control unit which acquires the authentication information of the user who uses the apparatus and determines whether the acquired authentication information coincides with the read out authentication information to allow the erasing unit to erase the image when determining that the acquired authentication information coincides with the read out authentication information.

Accordingly, according to the second embodiment, it is possible to restrict the use of the image forming apparatus 1 for each user. Furthermore, according to the second embodiment, it is possible to prevent the image on the sheet of other users from being erased by mistake.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image erasing apparatus which erases an image printed on a sheet, comprising:

an interface configured to receive a first user identification information;

a scanner configured to read an image formed on a sheet and acquire a second identification information based on the read image;

an erasing device disposed downstream from the scanner in a sheet conveyance direction, the erasing device being configured to erase the image formed on the sheet;

a conveyance unit including conveyance rollers configured to convey a sheet; and a tray configured to stack a sheet conveyed by the conveyance path;

a storage device that stores a table which includes a user identification information and an email address corresponding to the user identification information and a controller configured to:

determine whether the second user identification information matches the first user identification information, control the erasing device to erase the image if the second user identification information matches the first user identification information, and control the erasing device to not erase the image if the second user identification information does not match the first user identification information control the conveyance unit to convey the sheet to the tray without erasing the image and the second user identification information if the second user identification information does not match the first user identification information specify an email address based on a user identification which corresponds to the second user identification information if the second user identification information does not match the first user identification information, and send a message to the email address, the message indicating that the sheet is stacked in the tray without the image being erased.

2. The image erasing apparatus according to claim 1, wherein the controller is configured to determine whether the first user identification is authenticated if the interface receives the first user identification information, and allow the scanner to read the image formed on the sheet in order to acquire the second user identification information if the first user identification is authenticated.

3. The image erasing apparatus according to claim 1, wherein the tray includes a reuse box which accommodates a sheet on which the image is erased by the erasing device and a reject box which accommodates a sheet on which the image is not erased by the erasing device.

* * * * *